US006762210B1

(12) United States Patent
Oguro et al.

(10) Patent No.: US 6,762,210 B1
(45) Date of Patent: Jul. 13, 2004

(54) PROCESS FOR PRODUCING POLYMERIC ACTUATORS

(75) Inventors: Keisuke Oguro, Ikeda (JP); Kinji Asaka, Ikeda (JP); Tatsuhiro Okada, Tsukuba (JP); Kazuo Onishi, Amagasaki (JP); Shingo Sewa, Kanagawa (JP)

(73) Assignees: Eamex Corporation (JP); National Institute of Advanced Science and Technology (JP)

( * ) Notice: Subject to any disclaimer, the term of this patent is extended or adjusted under 35 U.S.C. 154(b) by 0 days.

(21) Appl. No.: 09/253,638

(22) Filed: Feb. 19, 1999

(30) Foreign Application Priority Data

Feb. 20, 1998 (JP) ............................................ 10-039121
Mar. 30, 1998 (JP) ............................................ 10-084495

(51) Int. Cl.[7] ................................................. C08J 5/20
(52) U.S. Cl. ........................... 521/27; 204/252; 204/282
(58) Field of Search ............................ 521/27; 204/282, 204/252

(56) References Cited

U.S. PATENT DOCUMENTS

| 3,892,592 | A | * | 7/1975 | Fukuda | ........................ | 136/129 |
| 4,159,367 | A | * | 6/1979 | Berchielli | ..................... | 429/38 |
| 4,364,803 | A | * | 12/1982 | Nidola | ......................... | 204/30 |
| 4,587,056 | A | * | 5/1986 | Fukuoka | ..................... | 560/341 |
| 4,804,592 | A | * | 2/1989 | Vanderborgh | ................ | 429/33 |
| 5,268,082 | A | | 12/1993 | Oguro et al. | ............... | 204/282 |
| 6,109,852 | A | * | 8/2000 | Shahinpoor | ................... | 414/1 |

FOREIGN PATENT DOCUMENTS

| CA | 2243527 | 7/1997 |
| JP | 04275078 | 9/1992 |
| JP | 08131545 | 5/1996 |
| WO | WO9726039 | 7/1997 |

OTHER PUBLICATIONS

Kanafuji, Keiichi et al., "Fabrication of Artificial Muscle Using Synthetic Polymer", *Applied Physics*. Vol. 65, No. 8. pp. 803–810 (1996), partial translation (3pp.).

Takashima, Wataru et al., "Electrochemomechanical Deformation of Polyaniline Films". *Jpn. J. Appl. Phys.*. vol. 34, Pt. 1, No. 7B (Jul. 1995) pp. 160–163.

Okuzaki, et al., "Electro–driven Polymer Gels with Biomimetic Motility," *Polymer Gels and Networks*, vol. 2, No. 3-4, pp. 267–277 (1994).

Caldwell, D.G., "Pseudomuscular actuator for use in dextrous manipulation," *Medical & Biological Engineering & Computing*. vol. 28, No. 6, pp. 595–600 (Nov. 1, 1990).

* cited by examiner

*Primary Examiner*—Bernard Lipman
(74) *Attorney, Agent, or Firm*—Webb Ziesenheim Logsdon Orkin & Hanson, P.C.

(57) ABSTRACT

A process for producing a polymeric actuator including an ion-exchange resin product and metal electrodes which are formed on the surface of the ion-exchange resin product is provided. The process involves repeatedly conducting the following steps (i) to (iii) to form the metal electrodes ranging from the surface of the ion-exchange resin product to the inside thereof: (i) a step of allowing the ion-exchange resin product to adsorb a metal complex (adsorption step), (ii) a step of reducing the metal complex adsorbed on the ion-exchange resin product by a reducing agent to deposit a metal on the surface of the ion-exchange resin product (deposition step), and (iii) a step of washing the ion-exchange resin product having the deposited metal (washing step). Through the above steps, a polymeric actuator having simple structure, capable of being easily miniaturized, showing quick response and capable of generating large displacement can be obtained.

17 Claims, 6 Drawing Sheets

PROCESS FOR PRODUCING POLYMERIC ACTUATORS

FIELD OF THE INVENTION

The present invention relates to novel polymeric actuators and a process for producing the same. More particularly, the invention relates to polymeric actuators functioning as actuators by bending or deforming ion-exchange resin products and to a process for producing the polymeric actuators.

BACKGROUND OF THE INVENTION

Recently, there is an enhanced demand for a miniaturized, lightweight and highly flexible actuator in the fields of medical equipment, industrial robots, micromachines and the like.

When the actuator is thus miniaturized, the friction and viscous force are dominant over the inertial force. Therefore, it has been difficult to employ the means for converting energy to motion with the use of inertial force, such as a motor or an engine, as the power source of a microactuator. Accordingly, the operating principles based on electrostatic attraction, piezoelectricity, ultrasonic wave, shape memory alloy and polymer expansion/contraction have been proposed for the microactuator.

The actuator of the electrostatic attraction type operates by attracting, for example, a plate or rod becoming an electrode toward a counter electrode, and, for example, one which bends an electrode by applying a voltage of about 100 V between the electrode and the counter electrode disposed with a spacing of about tens of microns is known. The piezoelectric actuator operates by applying a voltage of some volts to a piezoelectric element of a ceramic such as barium titanate so that the element is expanded and contracted, and one capable of controlling a nm-unit displacement is known. The ultrasonic actuator operates by combining frictional force with the ultrasonic vibration generated by the piezoelectric element or the like, or by effecting a runoff. The actuator of the shape memory alloy type operates by temperature change with the use of the marked change of the configuration of the shape memory alloy depending on temperature. The actuator of the polymer expansion/contraction type operates with the use of the expansion/contraction of the polymer depending on the temperature or change of pH and change of the concentration of environmental chemical substance.

However, these microactuators have drawbacks in that there is restriction in their respective operation environments, the response is unsatisfactory, the structure is complicated and the flexibility is poor. For example, for the operation of the actuator of the polymer expansion/contraction type, the solution in contact with the polymer must be replaced by the solution containing other salt. Therefore, it has been difficult to employ this actuator in the use requiring a small size and a rapid response.

In contrast, an actuator element comprising an ion-exchange membrane and electrodes coupled to surfaces of the ion-exchange membrane and adapted to apply a potential difference to the ion-exchange membrane in the hydrous state so that the ion-exchange membrane is curved or deformed has been proposed as one which can be easily miniaturized, realizes rapid response and operates with small electric power (see Japanese Patent Laid-open Publication No. 4(1992)-275078).

This actuator element is characterized by comprising an ion-exchange resin membrane (ion-exchange resin molding) and metal electrodes coupled to surfaces thereof in mutually insulating relationship and by being adapted to apply a potential difference between the metal electrodes while the ion-exchange resin membrane is in the hydrous state so that the ion-exchange resin membrane is curved or deformed.

In this actuator element, the electrodes are formed on the surfaces of the ion-exchange resin molding by chemical plating, electroplating, vacuum deposition, sputtering, coating, press bonding, fusion bonding or other methods. For example, the conventional process for forming the electrodes by the chemical plating includes a process comprising subjecting the ion-exchange membrane to etching of the surfaces thereof, bearing of a plating catalyst and immersion in a plating bath, thereby to form electrodes on the surfaces of the ion-exchange membrane and a process comprising the steps of making the surfaces of the ion-exchange resin membrane to adsorb a metal complex, followed by reducing the adsorbed complex, and then immersing the ion-exchange resin membrane in a plating bath to form the electrodes on the surfaces of the ion-exchange membrane.

However, the actuator element having the electrodes formed by the above methods has a drawback in that the displacement level is not satisfactory. In the conventional polymeric actuator, further, when the voltage applied between the electrodes is increased to obtain larger displacement and better response, water in the ion-exchange resin membrane is easily electrolyzed, and therefore bubbles are easily produced.

The present invention is intended to solve such problems associated with the prior art as mentioned above, and it is an object of the invention to provide an actuator element capable of generating large displacement, having rapid response and high flexibility, having simple structure and capable of being easily miniaturized, and a process for producing the same. It is another object of the present invention to provide a polymeric actuator free from occurrence of bubbles due to electrolysis of water when a potential difference is applied.

SUMMARY OF THE INVENTION

The process for producing a polymeric actuator according to the present invention is a process for producing a polymeric actuator comprising an ion-exchange resin product and metal electrodes which are formed on the surface of the ion-exchange resin product and are insulated from each other, said polymeric actuator operating as an actuator by applying a potential difference between the metal electrodes when the ion-exchange resin product is in the water-containing state to allow the ion-exchange resin product to undergo bending or deformation, wherein the following steps (i) to (iii) are repeatedly conducted to form the metal electrodes ranging from the surface of the ion-exchange resin product to the inside thereof;
(i) a step of allowing the ion-exchange resin product to adsorb a metal complex in an aqueous solution (adsorption step),
(ii) a step of reducing the metal complex adsorbed on the ion-exchange resin product by a reducing agent to deposit a metal on the surface of the ion-exchange resin product (deposition step), and
(iii) a step of washing the ion-exchange resin product having the deposited metal (washing step).

By virtue of the method to form metal electrodes through the above steps, metal deposition further proceeds to the interior of the ion-exchange resin product to increase the contact area between the ion-exchange resin product and the metal electrodes, whereby the number of electrode active spots is increased to thereby increase the quantity of ions which migrate to a negative electrode. In the polymeric actuator, water molecules accompanying the ions migrate to a negative electrode so that the water content in the vicinity of said electrode is decreased to thereby expand the negative electrode side of the resin product, while the water content in the vicinity of the positive electrode is decreased to thereby contract the positive electrode side of the resin product. Accordingly, when the quantity of ions which migrate to an electrode is increased, the quantity of water molecules which migrate to the electrode together with the ions is also increased. As a result, the difference in the water content between the vicinity of the negative electrode and the vicinity of the positive electrode becomes larger, and the degree of bending (deformation), namely, degree of displacement, is increased. Further, since the thickness of the metal electrode is increased, the surface resistance of the electrode is decreased to raise conductivity of the electrode.

According to the process of the invention, therefore, a polymeric actuator having simple structure, capable of being easily miniaturized, showing quick response and capable of generating large displacement can be obtained.

The polymeric actuator according to the present invention comprises an ion-exchange resin product and metal electrodes which are formed on the surface of the ion-exchange resin product containing an alkylammonium ion as a counter ion and are insulated from each other, said polymeric actuator operating as an actuator by applying a potential difference between the metal electrodes when the ion-exchange resin product is in the water-containing state to allow the ion-exchange resin product to undergo bending or deformation.

In the polymeric actuator of the invention, the counter ions of the ion-exchange resin product are exchanged with specific alkylammonium ions, and thereby bubbles are hardly produced even under application of a high voltage, differently from the conventional ion-exchange resins whose counter ion is $Na^+$ or $H^+$. In the polymeric actuator, further, water molecules accompanying the ions generally migrate to an electrode to increase the water content in the vicinity of said electrode. As a result, this electrode side of the resin product is swollen and expanded, while the water content in the vicinity of the opposite electrode is decreased to thereby contract the opposite electrode side of the resin product. Therefore, if the counter ions are exchanged with the alkylammonium ions, the difference in the water-content between the electrodes becomes larger, and the degree of bending (deformation), namely, degree of displacement, can be increased.

It is preferable that, as the alkylammonium ion, an alkylaluminum ion represented by the following formula (1) is contained. When such ions are contained, the difference in the water content between the electrodes becomes much larger, and the degree of bending (deformation), namely, degree of displacement, can be increased.

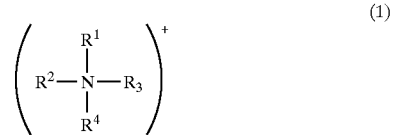

(1)

In the above formula, $R^1$ to $R^4$ may be the same or different and are each a hydrogen atom, a hydrocarbon group, an oxygen-containing hydrocarbon group or a nitrogen-containing hydrocarbon group, at least one of $R^1$ to $R^4$ is a group other than a hydrogen atom, and two or more of $R^1$ to $R^4$ may be bonded to form a ring.

In the polymeric actuator of the invention, it is more preferable that the alkylammonium ion is represented by the above formula (1), and it is particularly preferable that the alkylammonium ion is $CH_3N^+H_3$, $C_2H_5N^+H_3$, $(CH_3)_2N^+H_2$, $(C_2H_5)_2N^+H_2$, $(C_4H_9)_2N^+H_2$, $(C_5H_{11})_2N^+H_2$, $(CH_3)_3N^+H$, $(C_2H_5)_3N^+H$, $(C_4H_9)_3N^+H$, $(C_5H_{11})_3N^+H$, $(CH_3)_4N^+$, $(C_2H_5)_4N^+$, $(C_3H_7)_4N^+$, $(C_4H_9)_4N^+$, $H_3N^+(CH_2)_4N^+H_3$, $H_2C=CHCH_2N^+HCH_3$, $H_3N^+(CH_2)_4N^+H_2(CH_2)_4N^+H_3$, $HC\equiv CCH_2N^+H_2$, $CH_3CH(OH)CH_2N^+H_3$, $H_3N^+(CH_2)_5OH$, $H_3N^+CH(CH_2OH)_2$, $(HOCH_2)_2C(CH_2N^+H_3)_2$, $C_2H_5OCH_2CH_2N^+H_3$,

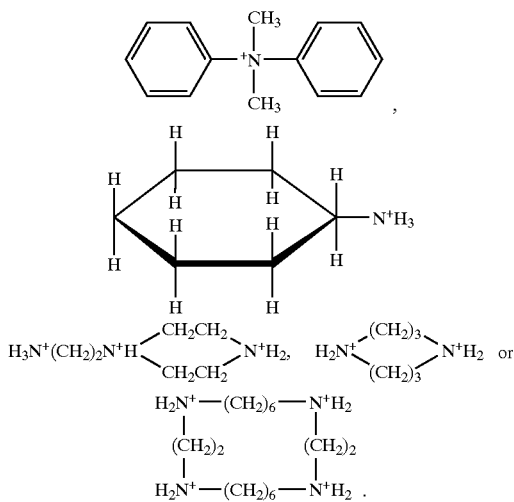

It is most preferable that the alkylammonium ion is $(C_4H_9)_3N^+H$, $(C_5H_{11})_3N^+H$, $(C_3H_7)_4N^+$ or $(C_4H_9)_4N^+$.

The polymeric actuator of the invention has a simple structure and can be easily miniaturized. Further, even if voltage is increased, production of bubbles caused by electrolysis of water present in the resin product can be inhibited. Furthermore, the polymeric actuator shows quick response and can generate large displacement.

DETAILED DESCRIPTION OF THE INVENTION

The present invention is described below in detail with reference to the attached drawings.

The present invention relates to the improvements of a polymeric actuator comprising an ion-exchange resin product and metal electrodes which are formed on the surface of the ion-exchange resin product and are insulated from each other, said polymeric actuator operating as an actuator by applying a potential difference between the metal electrodes when the ion-exchange resin product is in the water-containing state to allow the ion-exchange resin product to undergo bending or deformation, and a process for producing the same.

Figure 1:
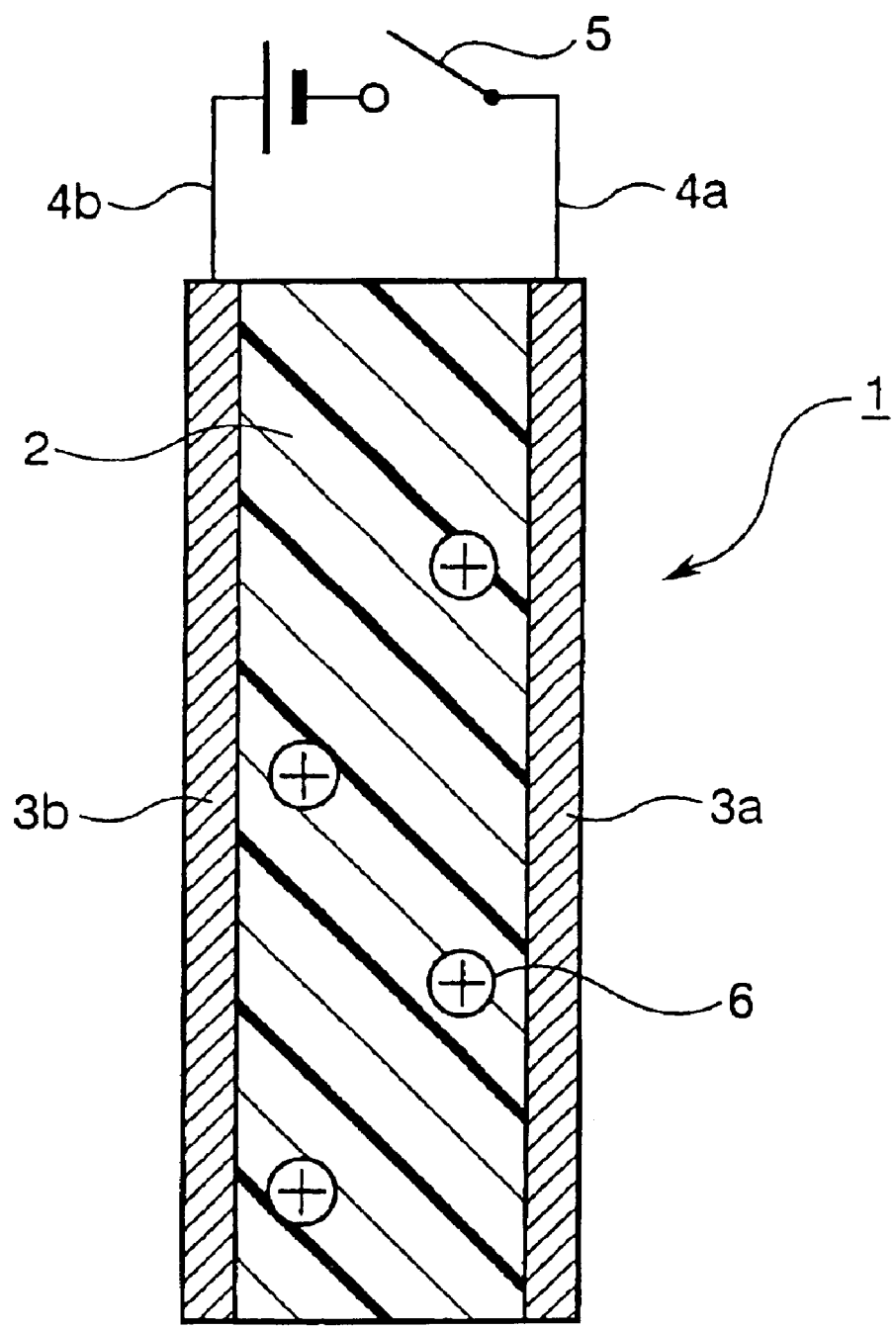
FIG. 1 is a schematic sectional view of a preferred embodiment of the polymeric actuator capable of applying the present invention, when no voltage is applied.
Figure 2A:
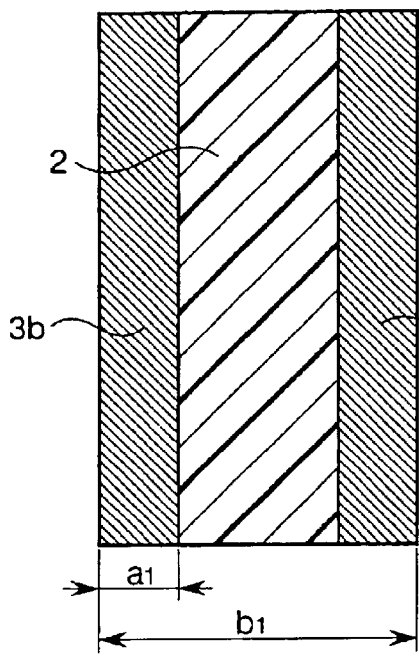
FIG. 2A is a schematic sectional view showing a preferred relation between the thickness of an electrode and the thickness of a resin product.

First, with reference to FIGS. 1 and 2A, a polymeric actuator capable of applying the present invention will be concretely described.

FIG. 1 is a schematic sectional view of an embodiment of the polymeric actuator capable of applying the present invention. FIG. 2A is a schematic sectional view showing a preferred relation between the thickness of an electrode and the thickness of a resin product. As shown in FIGS. 1 and 2A, the polymeric actuator 1 of the embodiment comprises an ion-exchange resin product 2 in the form of a slender rectangular flat plate (or film) and electrodes 3a, 3b which are formed on the surfaces of the ion-exchange resin product, respectively, and are insulated from each other. This polymeric actuator 1 is so designed that the ion-exchange resin product is bent or deformed by applying a potential difference between the electrodes 3a, 3b when the ion-exchange resin product 2 is in the water-containing state.

As shown in FIG. 1, to the electrodes 3a, 3b, one ends of a pair of lead wires 4a, 4b are electrically connected, respectively, and the other ends of the lead wires 4a, 4b are connected to a power source 5.

The form of the ion-exchange resin product 2 is not limited to the rectangular flat plate or film, and the resin product may be in the form of a film, a column or, as shown in FIGS. 2B to 2D or FIG. 6, a cylinder.

Examples of the ion-exchange resins for forming the ion-exchange resin product 2 include cation-exchange resins and amphoteric ion-exchange resins. Of these, the cation-exchange resins are preferably employed because they can increase the degree of displacement of the polymeric actuator.

The cation-exchange resins employable herein are, for example, those wherein functional groups such as sulfonic acid group and carboxyl group are introduced into polyethylene, polystyrene or fluororesins. In particular, the cation-exchange resins wherein functional groups such as sulfonic acid group and carboxyl group are introduced into fluororesins are preferable.

It is desirable that the cation-exchange resin has an ion-exchange capacity of 0.8 to 3.0 meq/g, preferably 1.4 to 2.0 meq/g. When a cation-exchange resin having such ion-exchange capacity is employed, the degree of displacement of the polymeric actuator can be further increased.

In the present invention, examples of metals for constituting the electrodes 3a, 3b include gold, platinum, palladium, rhodium and ruthenium.

The thickness of the electrodes formed on the surface of the ion-exchange resin product can be optionally determined in accordance with the shapes or materials of the ion-exchange resin product and the electrodes, or positions at which the electrodes are formed.

For example, when the ion-exchange resin product used is in the form of a plate or a film as shown in FIG. 2A, the electrode provided on each surface of the ion-exchange resin product desirably has such a thickness that the ratio of the thickness $a_1$ of the metal electrode formed on the ion-exchange resin product to the thickness $b_1$ of the ion-exchange resin product including the metal electrodes ($a_1/b_1$) is in the range of 0.03 to 0.40, preferably 0.15 to 0.30. If the $a_1/b_1$ ratio is in this range, a polymeric actuator capable of generating large displacement and having low surface resistance can be obtained.

Figure 2B:
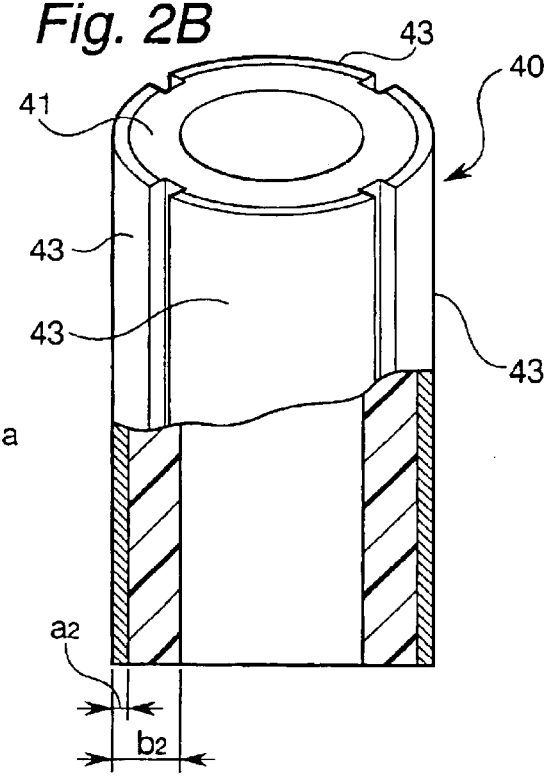
FIGS. 2B to 2D are each a schematic perspective view partially containing a section and showing the preferred relation between the thickness of an electrode and the thickness of a resin product in other embodiments capable of applying the present invention.
Figure 2C:
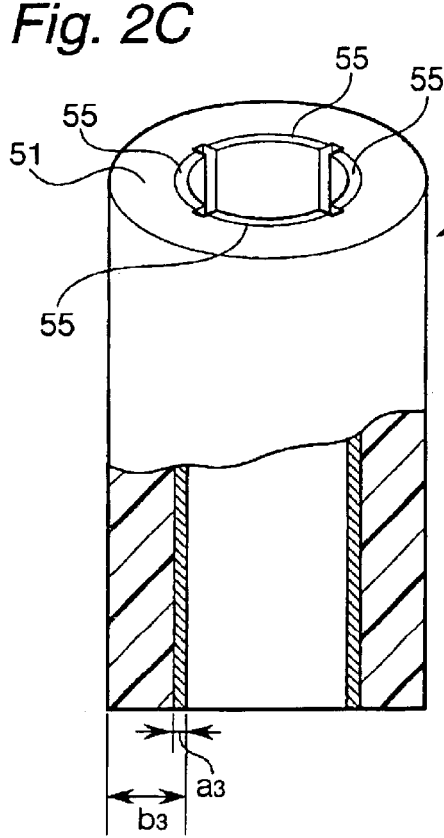
Figure 2D:
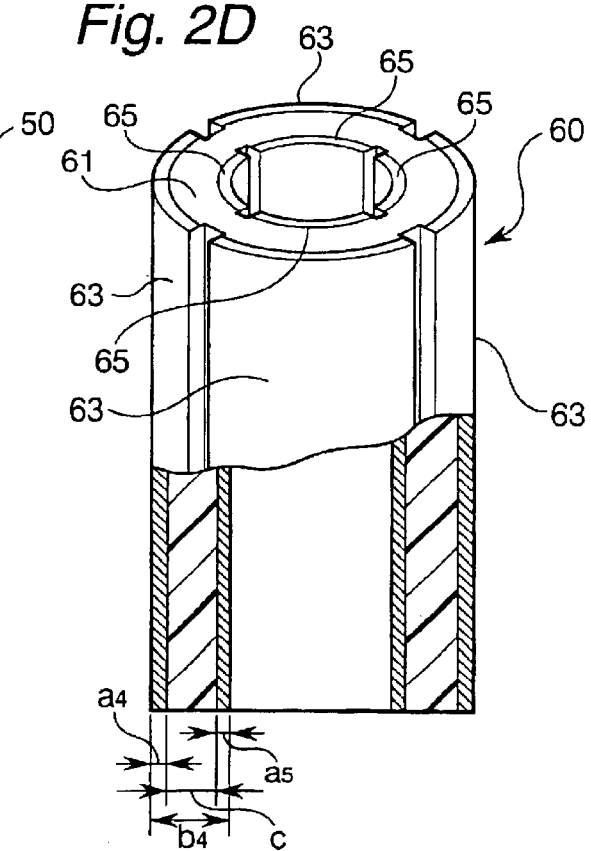

In the present invention, when the ion-exchange resin product is in the form of a cylinder (FIG. 2B), the metal electrodes may be provided on the outer surface of the cylinder, the inner surface thereof (FIG. 2C) or both of the outer and the inner surfaces thereof (FIG. 2D). In such cases, the relation between the thicknesses of the ion-exchange resin product and electrode can be also optionally determined.

In case of the polymeric actuator 40 as shown in FIG. 2B in which the metal electrodes 43 are provided on the outer surface of the cylindrical ion-exchange resin product 41, the ratio of the thickness $a_2$ of the metal electrode 43 to the thickness $b_2$ of the cylindrical ion-exchange resin product 41 including the metal electrodes 43 ($a_2/b_2$) is desirably in the range of 0.02 to 0.70, preferably 0.30 to 0.50. If the $a_2/b_2$ ratio is in this range, a polymeric actuator capable of generating large displacement and having low surface resistance can be obtained.

In case of the polymeric actuator 50 as shown in FIG. 2C in which the metal electrodes 55 are provided on the inner surface of the cylindrical ion-exchange resin product 51, the ratio of the thickness $a_3$ of the metal electrode 55 to the thickness $b_3$ of the cylindrical ion-exchange resin product 51 including the metal electrode 55 ($a_3/b_3$) is desirably in the range of 0.02 to 0.70, preferably 0.30 to 0.50. If the $a_3/b_3$ ratio is in this range, a polymeric actuator capable of generating large displacement and having low surface resistance can be obtained.

In case of the polymeric actuator 60 as shown in FIG. 2D in which the metal electrodes 63, 65 are provided on both of the outer and the inner surfaces of the cylindrical ion-exchange resin product 61, respectively, the ratio of the thickness C of the cylindrical ion-exchange resin product 61 excluding the metal electrodes 63, 65 to the thickness $b_4$ of the cylindrical ion-exchange resin product 61 including the metal electrodes 63, 65 ($C/b_4$) is desirably in the range of 0.20 to 0.95, preferably 0.45 to 0.70. Further, the ratio of the thickness $a_4$ of the metal electrode 63 provided on the outer surface of the cylindrical resin product 61 to the thickness aof the metal electrode 65 provided on the inner surface of the cylindrical resin product 61 ($a_4/a_5$) is desirably in the range of 0.05 to 20.0, preferably 0.50 to 2.00. If the $C/b_4$ ratio and the $a_4/a_5$ ratio are in these ranges, a polymeric actuator capable of generating large displacement and having low surface resistance can be obtained.

In the process for producing the polymeric actuators of the present invention, the electrodes as described above are prepared by the following method.

That is, the process for producing the polymeric actuator of the invention comprises the following steps:

(i) a step of allowing the ion-exchange resin product to adsorb a metal complex in an aqueous solution (adsorption step), (ii) a step of reducing the metal complex adsorbed on the ion-exchange resin product by a reducing agent to deposit a metal on the surface of the ion-exchange resin product (deposition step), and (iii) a step of washing the ion-exchange resin product having the deposited metal (washing step).

Examples of the metal complexes employable in the process of the invention include gold complex, platinum complex, palladium complex, rhodium complex and ruthenium complex. Of these, preferable are gold complex and platinum complex, and particularly preferable is gold complex because the displacement generated by the polymeric actuator can be increased.

The adsorption of the metal complex on the ion-exchange resin product is carried out by immersing the ion-exchange resin product in an aqueous solution containing the metal complex. Prior to the formation of metal electrode, the ion-exchange resin product may be subjected to any of the following treatments. Each of the treatments can be carried out singly or in combination.

(1) Water Treatment

The ion-exchange resin product is boiled in hot water.

(2) Hydrochloric Acid Treatment

The ion-exchange resin product is held in dilute hydrochloric acid of about 25 vol %.

(3) NaOH Treatment

The ion-exchange resin product is held in a sodium hydroxide aqueous solution of about 0.1N.

(4) Alcohol Treatment

The ion-exchange resin product is immersed in an alcohol such as methanol or ethanol.

(5) Autoclave Treatment

The ion-exchange resin product is heated at a temperature of 110 to 150° C. in an autoclave.

The reduction of the metal complex is carried out by immersing the ion-exchange resin product adsorbing the metal complex thereon in an aqueous solution containing a reducing agent.

As the reducing agent, sodium sulfite, hydrazine, potassium boron hydride or the like is employable, though the reducing agent used varies depending upon the type of the metal complex used. During the reduction of the metal complex, an acid or an alkali may be added if desired.

The above steps (i) to (iii) may be repeatedly conducted to form the metal electrodes on the surface of the ion-exchange resin product and further inside the resin product.

The number of cycles of the above steps is in the range of preferably 1 to 20, more preferably 4 to 9. The term "number of cycles" means the number of metal complex adsorption-reduction processes conducted on the metal film initially formed by allowing the ion-exchange resin product to adsorb a metal complex and then reducing the metal complex. The number of cycles is preferably utmost 20 because the effect of increasing the degree of displacement is hardly exerted when the number of cycles is more than 20.

In the reduction of the metal complex adsorbed on the ion-exchange resin product, the metal complex is contacted with the reducing agent to deposit a metal on the surface of the ion-exchange resin product. Subsequently, the metal complex present inside the film moves to the vicinity of the film surface (toward the deposited metal) and is then reduced to deposit a metal. That is, crystal growth of a metal proceeds from the surface of the ion-exchange resin product to the interior thereof. Therefore, deposition of the metal is conducted not only on the surface of the ion-exchange resin product but also in the interior near the surface. As a result, the contact area between the ion-exchange resin product and the metal electrode becomes larger than that in the conventional chemical plating method. Accordingly, by the repetition of the adsorption-deposition process as in the present invention, the metal deposition further proceeds inside the ion-exchange resin product, whereby the contact area between the ion-exchange resin product and the metal electrode is furthermore increased. With increase of the contact area, the number of electrode active spots is increased, and the number of ions migrating to the electrode is also increased. Hence, the difference in the water content between the electrodes becomes much larger, and as a result the degree of bending (deformation), namely, degree of displacement, is increased. Moreover, because of the increased contact area between the ion-exchange resin product and the metal electrode, the surface resistance of the electrode is decreased to raise conductivity of the electrode, and the degree of displacement is increased.

When the metal electrodes are formed by further repeating the above steps (i) to (iii), the degree of displacement of the element can be made much larger than that of the conventional polymeric actuators.

Then, the ion-exchange resin product having metal electrodes formed by the reduction of a metal complex is preferably subjected to a washing step to remove the unreacted metal complex and reducing agent.

Examples of the washing liquids preferably used include water, a sodium hydroxide aqueous solution, a sulfuric acid aqueous solution and a hydrochloric acid aqueous solution. When these washing liquids are used, the unreacted metal complex and reducing agent can be efficiently removed. In the use of these washing liquids, it is preferred that the concentration of the sodium hydroxide aqueous solution be in the range of 0.01 to 5.0 mol/liter, preferably 0.1 to 1 mol/liter; the concentration of the sulfuric acid aqueous solution be in the range of 0.01 to 6 mol/liter, preferably 0.1 to 6 mol/liter; and the concentration of the hydrochloric acid aqueous solution be in the range of 0.01 to 6 mol/liter, preferably 0.1 to 3 mol/liter.

Prior to the formation of the metal electrodes through the above steps, the ion-exchange resin product may be subjected to a surface roughening treatment. Examples of the surface roughening treatments include a sandblasting treatment and a sandpaper treatment. The surface of the ion-exchange resin product is roughened to such an extent that only a skin layer of the resin product is abraded.

By virtue of the roughening treatment, the contact area between the surface of the ion-exchange resin product and the electrode formed thereon is increased, and hence the displacement of the polymeric actuator can be increased.

When the ion-exchange resin product is in the form of a film, insulation of the electrode formed as above can be achieved by cutting edges of the resin product having the electrode thereon. When the ion-exchange resin product is in the form of a cylinder or a column, the insulation between the electrodes can be conducted by irradiating the resin product having the metal electrode thereon with a laser beam to remove a part of the metal electrode and thereby provide insulating zones between the electrodes.

After the formation of the electrodes on the ion-exchange resin product, the resin product may be subjected to the aforesaid treatments (1) to (5).

On the thus formed electrodes, an additional electrode layer may be provided. The additional electrode layer can be formed by chemical plating, electroplating, vacuum deposition, sputtering, coating, press bonding, welding or the like. Material of the additional electrode layer may be the same as or different from those of the metal electrodes formed on the surface and the interior of the ion-exchange resin product. By the provision of the additional electrode layer, the displacement of the polymeric actuator can be further increased.

Because the polymeric actuator produced by the process of the invention as described above can increase the degree of displacement by the above principle, the counter ions of the ion-exchange resin product are not particularly limited, and may be $Na^+$ or $H^+$, or may be alkylammonium ions as used in the polymeric actuator of the present invention. However, in the polymeric actuator, it is particularly preferred that the counter ions contained in the ion-exchange resin product are the alkylammonium ions, for the reason described below.

The polymeric actuator of the present invention comprises an ion-exchange resin product containing as a counter ion, an alkylammonium ion and electrodes which are formed on the surface of the ion-exchange resin product and are insulated from each other.

The polymeric actuator of the invention can be produced by immersing the ion-exchange resin product having, on its surface, metal electrodes insulated from each other in an aqueous solution containing alkylammonium ions to exchange the counter ions with the alkylammonium ions. In the polymeric actuator of the present invention, an aqueous solution of an alkylammonium salt such as chloride bioxide or iodide of the alkylammonium is generally used for exchanging the counter ions.

In the aqueous solution, the alkylammonium salt is contained in an amount equal to or more than that of the functional group of the ion-exchange resin, that is, the concentration of the alkylammonium salt is in the range of 0.01 to 10 mol/l, preferably 0.1 to 1.0 mol/l.

It is preferable that the alkylammonium ions contain alkylammonium ions represented by the following formula (1). It is also preferable that the alkylammonium ions are alkylammonium ions represented by the following formula (1).

$$\left( R^2 - \underset{\underset{R^4}{|}}{\overset{\overset{R^1}{|}}{N}} - R_3 \right)^+ \quad (1)$$

In the above formula, $R^1$ to $R^4$ may be the same or different and are each a hydrogen atom, a hydrocarbon group, an oxygen-containing hydrocarbon group or a nitrogen-containing hydrocarbon group, at least one of $R^1$ to $R^4$ is a group other than a hydrogen atom, and two or more of $R^1$ to $R^4$ may be bonded to form a ring.

As the alkylammonium ions represented by the formula (1), preferable are $CH_3N^+H_3$, $C_2H_5N^+H_3$, $(CH_3)_2N^+H_2$, $(C_2H_5)_2N^+H_2$, $(CH_3)_3N^+H$, $(C_2H_5)_3N^+H$, $(CH_3)_4N^+$, $(C_2H_5)_4N^+$, $(C_3H_7)_4N^+$, $(C_4H_9)_4N^+$, $H_3N^+(CH_2)_4N^+H_3$, $H_2C=CHCH_2N^+HCH_3$, $H_3N^+(CH_2)_4N^+H_2(CH_2)_4N^+H_3$, $HC\equiv CCH_2N^+H_2$, $CH_3CH(OH)CH_2N^+H_3$, $H_3N^+(CH_2)_5OH$, $H_3N^+CH(CH_2OH)_2$, $(HOCH_2)_2C(CH_2N^+H_3)_2$, $C_2H_5OCH_2CH_2N^+H_3$,

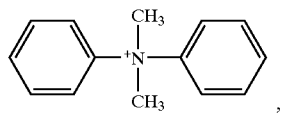

-continued

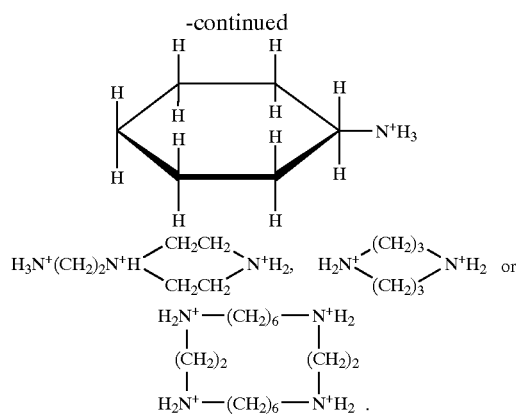

$H_3N^+(CH_2)_2N^+H\begin{array}{c}CH_2CH_2\\ \diagup \diagdown\\ \diagdown \diagup\\ CH_2CH_2\end{array}N^+H_2,\quad H_2N^+\begin{array}{c}(CH_2)_3\\ \diagup \diagdown\\ \diagdown \diagup\\ (CH_2)_3\end{array}N^+H_2$ or $H_2N^+-(CH_2)_6-N^+H_2$
  |                |
$(CH_2)_2$        $(CH_2)_2$
  |                |
$H_2N^+-(CH_2)_6-N^+H_2$ .

More preferable are $(C_4H_9)_3N^+H$, $(C_5H_{11})_3N^+H$, $(C_3H_7)_4N^+$ and $(C_4H_9)_4N^+$. These alkylammonium ions may be used singly or in combination of two or more kinds.

In the polymeric actuator of the present invention, the process for forming the metal electrodes is not limited and, for example, can be formed by any conventional methods.

In order that the polymeric actuator of the invention and that prepared by the process of the work, the ion-exchange resin product is required to be in a water-containing state. The expression "water-containing state" used herein means that counter ions can immigrate corresponding to a potential difference because the ion-exchange resin product contains water. In the present invention, the polymeric actuator can work even in water or in the atmosphere of high humidity, with the proviso that it is in such water-containing state.

Hereinafter, the working principle of the polymeric actuator will be further described with referring to FIG. 3.

Figure 3:
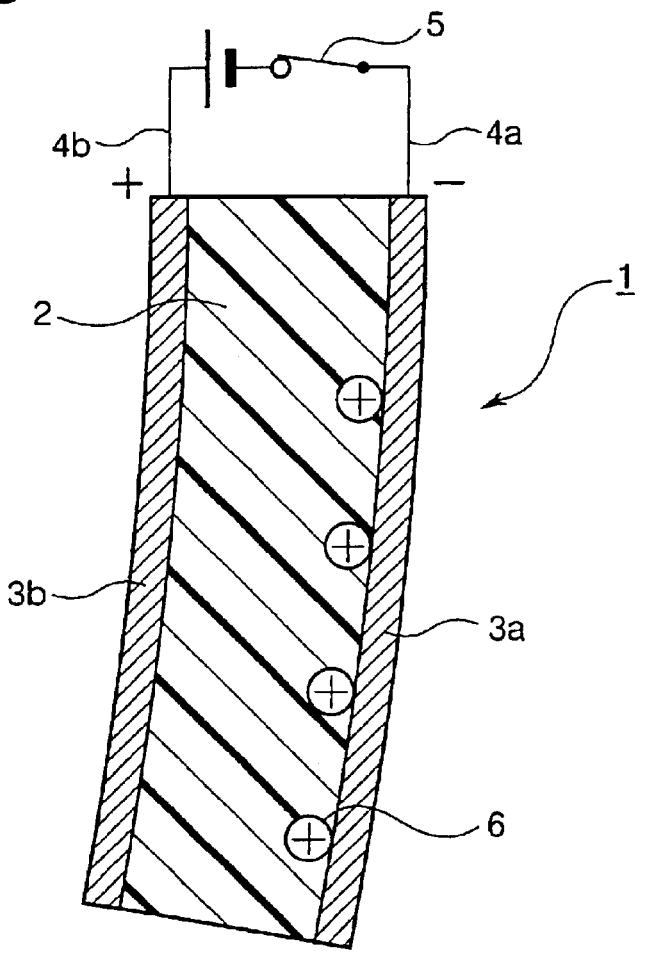
FIG. 3 is a schematic sectional view showing the polymeric actuator of FIG. 1 when a voltage is applied.

That is, as shown in FIG. 3, when a potential difference is applied to the surfaces of the ion-exchange resin product 2 through the metal electrodes 3a, 3b insulated from each other, the positive ions 6 migrate to the cathode side (in FIG. 3, electrode 3a) in the ion-exchange resin product 2, and the water molecules accompanying the positive ions 6 also migrate in the resin product 2. As a result, the water content in the vicinity of the cathode (electrode 3a) is increased to swell and expand the cathode side of the resin product 2, while the water content in the vicinity of the anode (opposite side, in FIG. 3, electrode 3b) is decreased to contract the anode side of the resin product 2. Thus, by virtue of the difference in the water content between the electrodes 3a, 3b, the ion-exchange resin product 2 is bent.

In the polymeric actuator of the invention, since the water molecules migrate together with the ions, and the ions having large ionic radius such as alkylammonium ions are used as the migrating ions, the difference in the water content between the electrodes is further increased, and, as a result, the degree of bending (deformation), namely, degree of displacement, is increased. That is, the polymeric actuator of the invention generates larger displacement of element as compared with the conventional polymeric actuators. In the polymeric actuator of the invention containing alkylammonium ions, further, water contained in the ion-exchange resin product is hardly electrolyzed even if a high voltage is applied, and therefore production of bubbles can be inhibited, differently from the conventional polymeric actuators wherein $Na^+$ or $H^+$ ions are contained. Hence, a higher voltage than that applied to the conventional polymeric actuators can be applied to the polymeric actuator of the invention, and hence the response of the polymeric actuator can be improved.

When a direct-current voltage of 0.1 to 3 V is applied between the electrodes of the polymeric actuator prepared by a process of the present invention, the polymeric actuator can obtain a displacement of about 0.5 to 3 times as large as the element within several seconds. While, when a direct-current voltage of 0.1 to 4 V is applied between the electrodes of the polymeric actuator of the invention, the polymeric actuator can obtain a displacement of about 1 to 3 times the length of the element within several seconds. Further, the polymeric actuator can undergo flexible movement in water.

Figure 4:
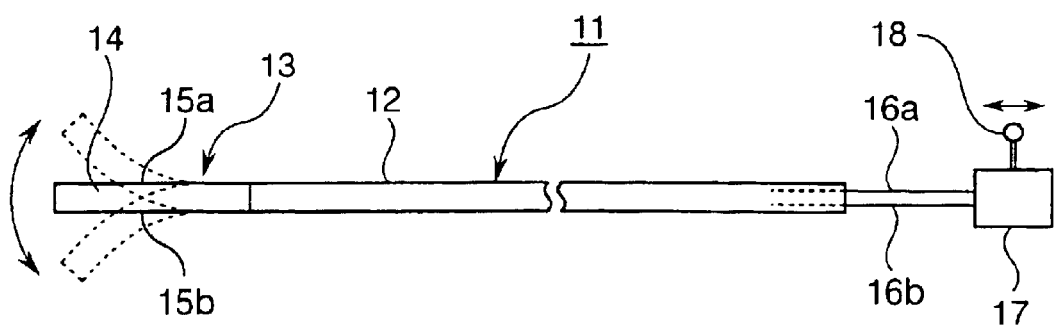
FIG. 4 is a schematic view showing an embodiment of use application of the polymeric actuator.

An embodiment of use application of the polymeric actuators as described above is a guide shown in FIGS. 4 and 5.

In this application, a guide wire 11 as the guide consists of a linear member 12 made of, for example, a slender synthetic resin tube or a slender stainless tube and a polymeric actuator 13 joined to a tip of the linear member 12.

The actuator 13 comprises an ion-exchange resin product 14 in the form of a slender rectangular flat plate and a pair of electrodes 15a, 15b disposed on both surfaces of the resin product, which can be formed by the method of the invention. By applying a voltage between the electrodes 15a, 15b, the polymeric actuator 13 is bent in two directions.

To the electrodes 15a, 15b, one ends of a pair of lead wires 16a, 16b are electrically connected, respectively. The lead wires 16a, 16b extend inside the linear member 12, and the other ends of the lead wires 16a, 16b are connected to an operation controller 17.

The operation controller 17 is equipped with a switchable operating lever 18. By operating the lever 18, the direction of the current from a power source 20 to the lead wires 16a, 16b can be switched by way of a double-pole double-throw switch 19 incorporated inside the operation controller 17.

Figure 5:
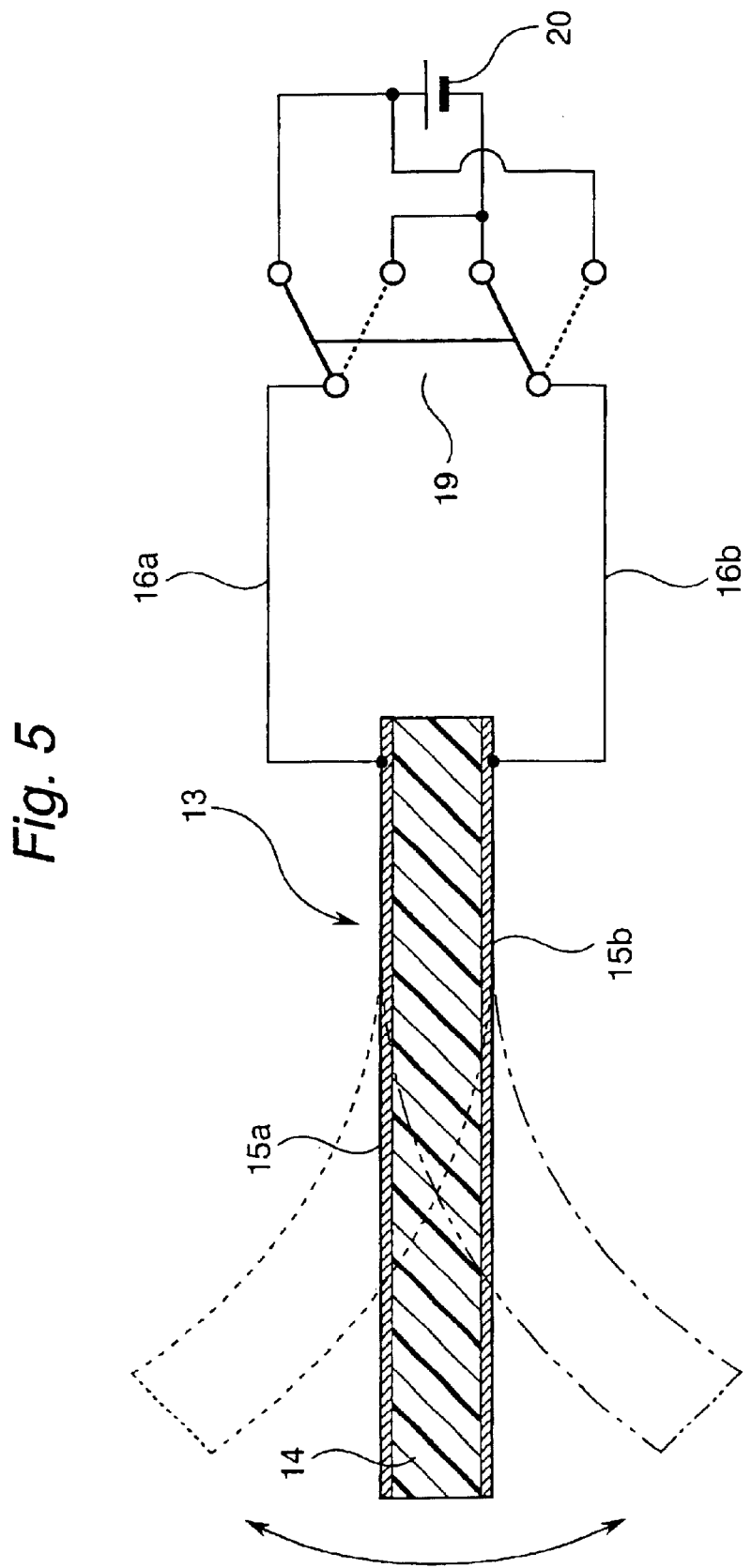
FIG. 5 is a schematic sectional view for illustrating a movement of the actuator in the use application of FIG. 4.

Referring to FIG. 5, when the double-pole double-throw switch 19 is positioned as indicated by the solid line, one lead wire 16a is connected to a positive electrode 15a and the other lead wire 16b is connected to a negative electrode 15b, whereby the actuator 13 is bent as indicated by the broken lines in FIG. 5. If the double-pole double-throw switch 19 is switched by the operating lever 18 of the operation controller 17 through a neutral position to the position indicated by the broken line in FIG. 5, the lead wire 16a is connected to a negative electrode 15b and the lead wire 16b is connected to a positive electrode 15a, whereby the actuator 13 is reversely bent to the position indicated by the two-dot chain line in FIG. 5.

Thus, the polymeric actuator 13 can be arbitrarily and positively deformed by the switching operation between the anode and the cathode.

Figure 6:
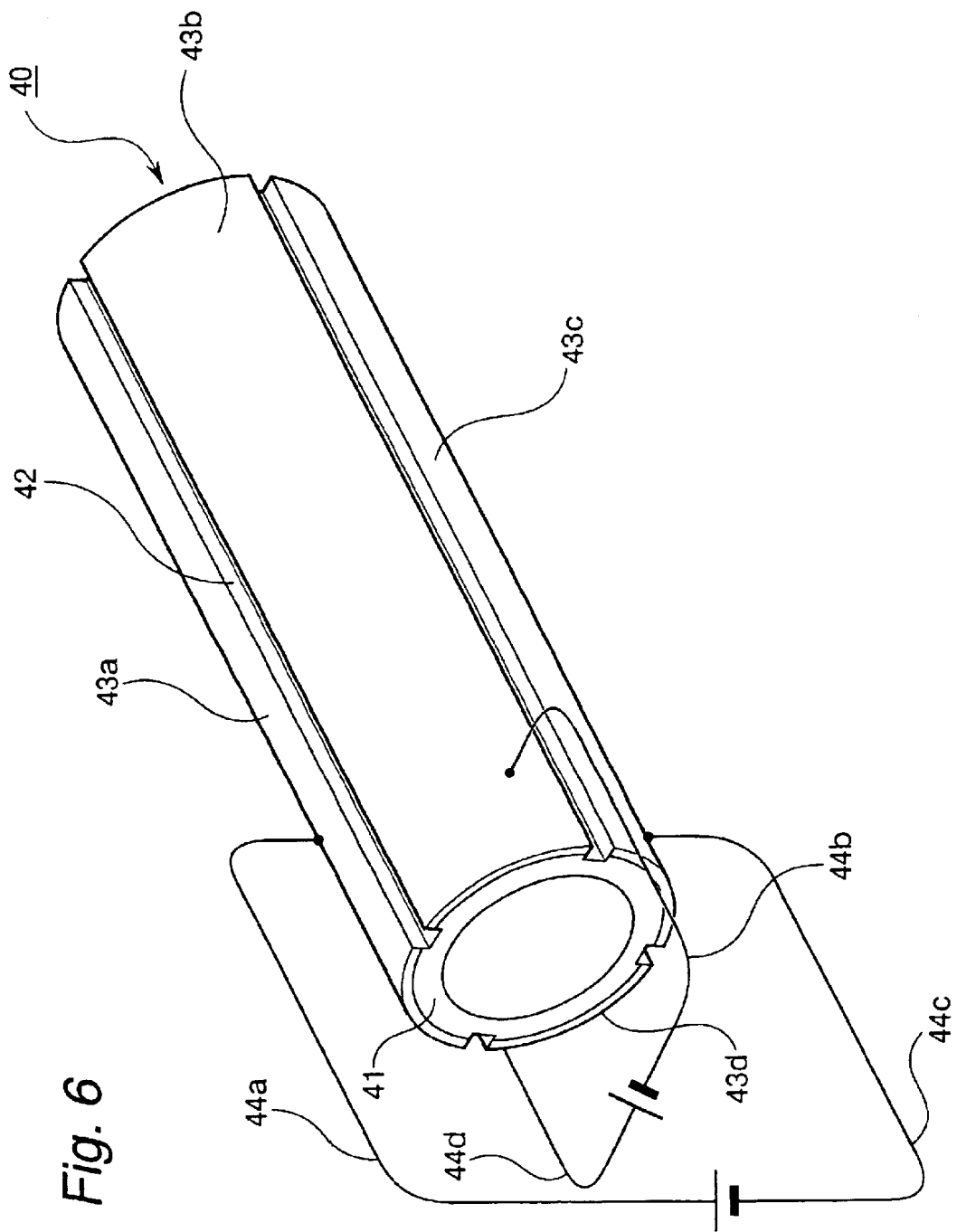
FIG. 6 is a schematic view showing another embodiment of the polymeric actuator capable of applying the present invention.

Another embodiment of use application of the polymeric actuator as described above is a cylindrical polymeric actuator 40 shown in FIG. 6.

In the production of the cylindrical polymeric actuator according to the process of the invention, metal electrodes are formed in the following manner. First, a metal complex is adsorbed on an ion-exchange resin product 41 and reduced by a reducing agent in accordance with the aforesaid method to deposit a metal on the surface of the ion-exchange resin product 41. The metal complex adsorption-reduction operation and the metal deposition operation are repeated to grow the deposited metal, whereby a metal layer extending from the surface of the ion-exchange resin product 41 to the interior thereof is formed.

Then, the cylindrical ion-exchange resin product 41 provided with a metal layer on the outer surface is irradiated with a laser beam from a laser beam machine to remove the irradiated metal layer, whereby insulating zones 42 in the form of groove and metal electrodes 43a, 43b, 43c, 43d which are electrically insulated from each other by the zones 42 are formed.

In the polymeric actuator shown in FIG. 6, to the metal electrodes 43a, 43b, 43c and 43d, one ends of lead wires 44a, 44b, 44c and 44d are electrically connected, respectively. This polymeric actuator can be bent in four directions by applying a voltage between the electrodes 43a and 43c oppositely positioned across the ion-exchange resin product 41 and between the electrodes 43b and 43d oppositely positioned across the ion-exchange resin product 41. The polymeric actuator can also undergo rotating by combining the bending directions.

Such metal electrodes as mentioned above may be provided on the inner surface of the ion-exchange resin product, or may be provided on both of the inner and the outer surfaces of the resin product.

According to the process for preparing polymeric actuator of the invention, since a metal electrode is formed by repeating the specific steps as described above, the contact area between the ion-exchange resin product and the metal electrode can be increased to increased the quantity of ions migrating to the electrode increased, and the thickness of the metal electrodes can be to reduce the surface resistance of the electrodes, thereby to improve the conductivity thereof. Therefore, the polymeric actuator thus obtained is high in the degree of bending (deformation), namely, degree of displacement and exhibits quick response.

According to the process of the invention, therefore, a polymeric actuator having simple structure, capable of being miniaturized, showing quick response, generating large displacement and capable of working with low power can be obtained.

In the polymeric actuator of the invention, since the counter ion of the ion-exchange resin product is exchanged with a specific alkylammonium ion, the quantity of water molecules which migrate together with the alkylammonium ions by the application of the potential difference is increased, whereby the difference in the water content between the electrodes becomes much larger, and even if a high voltage is applied between the electrodes of the polymeric actuator, electrolysis of water in the ion-exchange resin product hardly takes place and production of bubbles is inhibited, differently from the generally used ion-exchange resins whose counter ion is $Na^+$ or $H^+$. Accordingly, in the polymeric actuator of the invention, the degree of bending (deformation), namely, degree of displacement, is increased, and a higher voltage than that applied to the conventional polymeric actuators can be applied to the polymeric actuator of the invention, and hence the response can be quickened.

According to the invention, therefore, a polymeric actuator having simple structure, capable of being easily miniaturized, showing quick response, generating large displacement, capable of working with low power and free from occurrence of bubbles due to electrolysis of water even when a potential difference is increased in order to increase the displacement can be obtained.

If the polymeric actuator of the invention or the polymeric actuator obtained by the process of the invention is used as a guide means for surgical equipment for microsurgery, such as scissors, forceps, snare, laser knife and spatula, or microdevices such as various sensors and tools, the guidance can be improved because the polymeric actuator can be arbitrarily and positively bent (deformed) by the operation of the operation controller. As a result, the surgical equipment or the microdevices can be turned toward the desired place, and the turning operation can be rapidly and easily performed without skill.

If the polymeric actuator of the invention or the polymeric actuator of the invention is applied to surgical equipment such as tweezers, scissors, forceps, snare, laser knife, spatula and clip used for the microsurgery such as eye-ball operation, intra-cavity endoscopic operation and microvein suture operation, pain inflicted on the patients in the tests or treatments can be greatly eased, and physical or mental burden on the patients can be reduced.

If the polymeric actuators are applied to various sensors or repair tools to inspect or repair facilities of plants such as power plant, and mechanical systems such as air craft engines or the like (particularly for piping system or engine interior), the inspection or the repairing can be surely performed without much labor or time.

In addition to the above application, the polymeric actuator of the invention or the polymeric actuator obtained by the process of the invention can be favorably applied to high-frequency vibrating micropumps, health machines such as auxiliary power massage machine for rehabilitation, hygrometers, hygrometer controlling devices, soft manipulators, submerged valves, industrial machinery such as soft conveyor, underwater mobiles such as artificial goldfish and artificial seaweed, and hobby goods such as moving fishing bait and propulsive fin.

EXAMPLE

The present invention is further described with reference to the following examples, but it should be construed that the invention is in no way limited to those examples.

Figure 7:
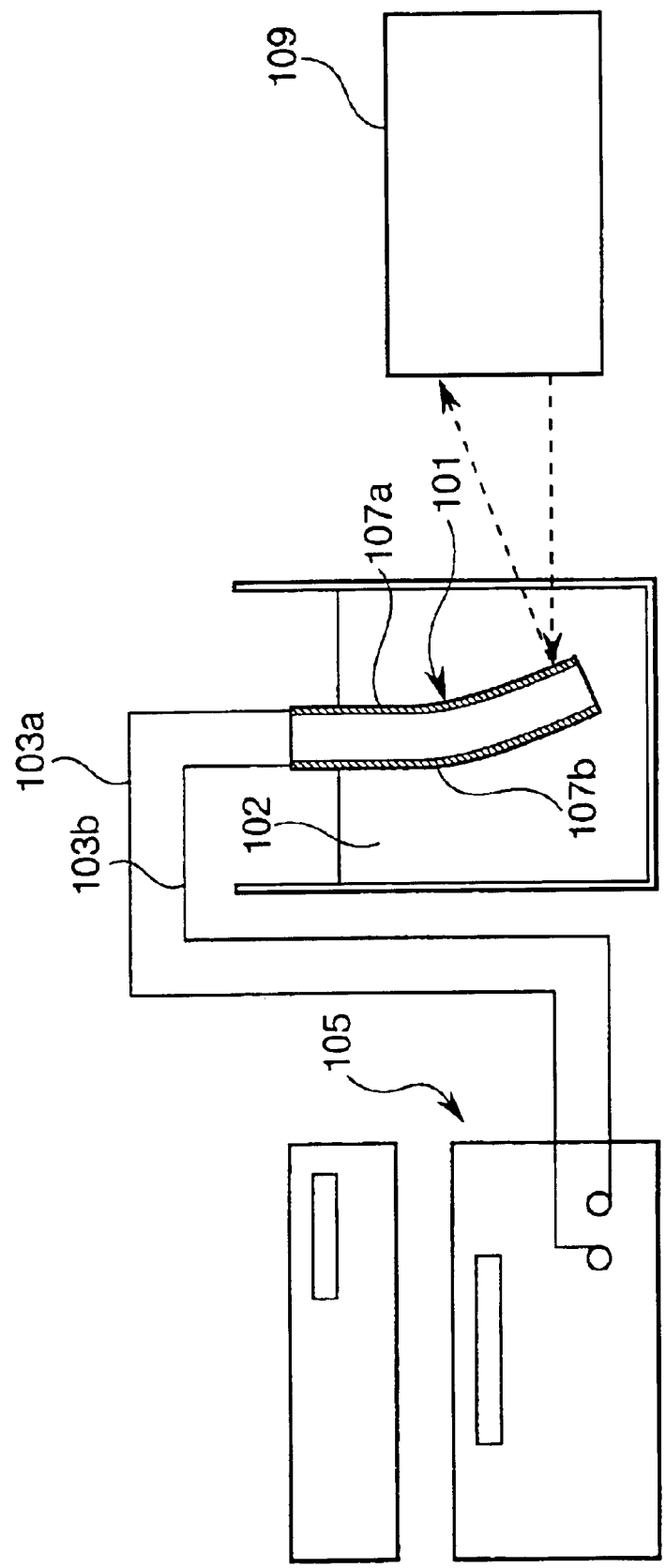
FIG. 7 is a schematic view for illustrating a principle of measuring the degree of displacement in Examples 1 to 21 and Comparative Examples 1 and 2.

In Examples and Comparative Examples, the measurement of the degree of displacement was carried out as follows: as shown in FIG. 7, at the position of 8 mm from one end of the specimen 101, the specimen was interposed between platinum plates, and the specimen 101 with the platinum plates was held in water. Lead wires 103a, 103b were extended from the platinum plates and connected to a potentiostat 105. A voltage was applied between the gold electrodes 107a, 107b on the both sides of the specimen 101. The degree of displacement was determined by measuring a displacement at the position of 10 mm from the fixed end by means of a laser displacement meter.

Example 1

A filmy fluororesin type ion-exchange resin product having a film thickness of 140 μm (ion-exchange capacity: 1.4 meq/g) was subjected to a surface roughening treatment with alumina particles of #800. Then, the ion-exchange resin product was subjected to two cycles of the following steps (1) to (3) to form gold electrodes on the surfaces of the resin product.

(1) Adsorption Step

The ion-exchange resin product is immersed in an aqueous solution of phenanthrine gold chloride for 24 hours to allow the resin product to adsorb a phenanthrine gold complex.

(2) Deposition Step

In an aqueous solution containing sodium sulfite and NaOH, the adsorbed phenanthrine gold complex is reduced to form gold electrodes on the surfaces of the ion-exchange resin product. The reduction of the phenanthrine gold complex is carried out at an aqueous solution temperature of 60 to 80 °C. for 6 hours with slowly adding sodium sulfite.

(3) Washing Step

The ion-exchange resin product on the surfaces of which gold electrodes have been formed is taken out and washed with water at 70° C. for 1 hour.

The resulting ion-exchange resin product provided with gold electrodes was cut to give a specimen having a size of 1.0 mm×20 mm, and the surface resistance of the specimen was measured. Then, a voltage (square wave of 0.1 Hz and 2.0 V) was applied to the specimen through the electrodes on the front and back sides to measure the degree of displacement (bending).

The degree of displacement of the specimen was 2.0 mm, and the surface resistance of the specimen was 10Ω.

Example 2

A specimen was prepared in the same manner as in Examples 1, except that the steps (1) to (3) were repeated 3 cycles. The specimen was evaluated in the same manner as in Example 13.

As a result, the degree of displacement of the specimen was 3.2 mm, and the surface resistance of the specimen was 5Ω.

Example 3

A specimen was prepared in the same manner as in Examples 1, except that the steps (1) to (3) were repeated 4 cycles. The specimen was evaluated in the same manner as in Example 13.

As a result, the degree of displacement of the specimen was 3.7 mm, and the surface resistance of the specimen was 2Ω.

Example 4

A specimen was prepared in the same manner as in Examples 1, except that the steps (1) to (3) were repeated 5 cycles. The specimen was evaluated in the same manner as in Example 13.

As a result, the degree of displacement of the specimen was 3.9 mm, and the surface resistance of the specimen was 1Ω.

Example 5

A specimen was prepared in the same manner as in Examples 1, except that the steps (1) to (3) were repeated 6 cycles. The specimen was evaluated in the same manner as in Example 13.

As a result, the degree of displacement of the specimen was 4.2 mm, and the surface resistance of the specimen was 1Ω.

Example 6

A specimen was prepared in the same manner as in Examples 1, except that the steps (1) to (3) were repeated 7 cycles. The specimen was evaluated in the same manner as in Example 13.

As a result, the degree of displacement of the specimen was 4.5 mm, and the surface resistance of the specimen was 0.5Ω.

Example 7

A specimen was prepared in the same manner as in Examples 1, except that the steps (1) to (3) were repeated 8 cycles. The specimen was evaluated in the same manner as in Example 13.

As a result, the degree of displacement of the specimen was 5.0 mm, and the surface resistance of the specimen was 0.5Ω.

Example 8

A specimen was prepared in the same manner as in Examples 1, except that the steps (1) to (3) were repeated 9 cycles. The specimen was evaluated in the same manner as in Example 13.

As a result, the degree of displacement of the specimen was 5.3 mm, and the surface resistance of the specimen was 0.5Ω.

Example 9

A specimen was prepared in the same manner as in Examples 1, except that the steps (1) to (3) were repeated 10 cycles. The specimen was evaluated in the same manner as in Example 13.

As a result, the degree of displacement of the specimen was 5.5 mm, and the surface resistance of the specimen was 0.5Ω.

Comparative Example 1

A specimen was prepared in the same manner as in Examples 1, except the steps (1) to (3) were not repeated. The specimen was evaluated in the same manner as in Example 13.

As a result, the degree of displacement of the specimen was 2.0 mm, and the surface resistance of the specimen was 10Ω.

It can be seen from the above results that, as the number of cycles of the steps (1) to (3) becomes larger, a polymeric actuator exhibiting larger displacement and lower surface resistance can be obtained. It can be also seen that the effect on the degree of displacement and the surface resistance becomes greater especially when the number of cycles is 4 to 9.

Example 10

A rectangular ion-exchange resin product provided with gold electrodes (ion-exchange capacity: 1.8 meq/g) was cut into a size of 1.0 mm×20 mm and immersed in a 0.5M $(C_2H_5)NH_3Cl$ aqueous solution for 24 hours to give a specimen. Then, a voltage (square wave of 0.1 Hz and 1.5 V) was applied to the specimen through the electrodes on the front and back sides to measure the degree of displacement. Further, a voltage (square wave of 0.1 Hz) at which bubbles were produced was measured.

The results are set forth in Table 1.

Example 11

A rectangular ion-exchange resin product provided with gold electrodes (ion-exchange capacity: 1.8 meq/g) was cut into a size of 1.0 mm×20 mm and immersed in a 0.5M $(CH_3)_2NH_2Cl$ aqueous solution for 24 hours to give a specimen. Then, a voltage (square wave of 0.1 Hz and 1.5 V) was applied to the specimen through the electrodes on the front and back sides to measure the degree of displacement. Further, a voltage (square wave of 0.1 Hz) at which bubbles were produced was measured.

The results are set forth in Table 1.

Example 12

A rectangular ion-exchange resin product provided with gold electrodes (ion-exchange capacity: 1.8 meq/g) was cut into a size of 1.0 mm×20 mm and immersed in a 0.5M $(C_2H_5)_3NHCl$ aqueous solution for 24 hours to give a specimen. Then, a voltage (square wave of 0.1 Hz and 1.5 V) was applied to the specimen through the electrodes on the front and back sides to measure the degree of displacement. Further, a voltage (square wave of 0.1 Hz) at which bubbles were produced was measured.

The results are set forth in Table 1.

Example 13

A rectangular ion-exchange resin product provided with gold electrodes (ion-exchange capacity: 1.8 meq/g) was cut into a size of 1.0 mm×20 mm and immersed in a 0.5M $(C_3H_7)_4NCl$ aqueous solution for 24 hours to give a specimen. Then, a voltage (square wave of 0.1 Hz and 1.5 V) was applied to the specimen through the electrodes on the front and back sides to measure the degree of displacement. Further, a voltage (square wave of 0.1 Hz) at which bubbles were produced was measured.

The results are set forth in Table 1.

Example 14

A rectangular ion-exchange resin product provided with gold electrodes (ion-exchange capacity: 1.8 meq/g) was cut into a size of 1.0 mm×20 mm and immersed in a 0.5M $(C_4H_9)_4NCl$ aqueous solution for 24 hours to give a specimen. Then, a voltage (square wave of 0.1 Hz and 1.5 V) was applied to the specimen through the electrodes on the front and back sides to measure the degree of displacement. Further, a voltage (square wave of 0.1 Hz) at which bubbles were produced was measured.

The results are set forth in Table 1.

Example 15

A rectangular ion-exchange resin product provided with gold electrodes (ion-exchange capacity: 1.8 meq/g) was cut into a size of 1.0 mm×20 mm and immersed in an aqueous solution (concentration: 0.5 M) of a chloride of an alkylammonium ion represented by the following formula for 24 hours to give a specimen. Then, a voltage (square wave of 0.1 Hz and 1.5 V) was applied to the specimen through the electrodes on the front and back sides to measure the degree of displacement. Further, a voltage (square wave of 0.1 Hz) at which bubbles were produced was measured.

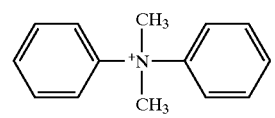

The results are set forth in Table 1.

Example 16

A rectangular ion-exchange resin product provided with gold electrodes (ion-exchange capacity: 1.8 meq/g) was cut into a size of 1.0 mm×20 mm and immersed in an aqueous solution (concentration: 0.5 M) of a chloride of an alkylammonium ion represented by the following formula for 24 hours to give a specimen. Then, a voltage (square wave of 0.1 Hz and 1.5 V) was applied to the specimen through the electrodes on the front and back sides to measure the degree of displacement. Further, a voltage (square wave of 0.1 Hz) at which bubbles were produced was measured.

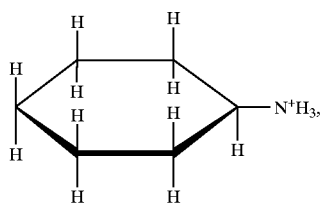

The results are set forth in Table 1.

Example 17

A rectangular ion-exchange resin product provided with gold electrodes (ion-exchange capacity: 1.8 meq/g) was cut into a size of 1.0 mm×20 mm and immersed in an aqueous solution (concentration: 0.5 M) of a chloride of an alkylammonium ion represented by the following formula for 24 hours to give a specimen. Then, a voltage (square wave of 0.1 Hz and 1.5 V) was applied to the specimen through the electrodes on the front and back sides to measure the degree of displacement. Further, a voltage (square wave of 0.1 Hz) at which bubbles were produced was measured.

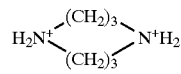

The results are set forth in Table 1.

Example 18

A rectangular ion-exchange resin product provided with gold electrodes (ion-exchange capacity: 1.8 meq/g) was cut into a size of 1.0 mm×20 mm and immersed in an aqueous solution (concentration: 0.5 M) of a chloride of $H_2C=CHCH_2N^+H_2CH_3$ for 24 hours to give a specimen. Then, a voltage (square wave of 0.1 Hz and 1.5 V) was applied to the specimen through the electrodes on the front and back sides to measure the degree of displacement. Further, a voltage (square wave of 0.1 Hz) at which bubbles were produced was measured.

The results are set forth in Table 1.

Example 19

A rectangular ion-exchange resin product provided with gold electrodes (ion-exchange capacity; 1.8 meq/g) was cut into a size of 1.0 mm×20 mm and immersed in an aqueous solution (concentration: 0.5 M) of a chloride of $CH_3CH(OH)CH_2N^+H_3$ for 24 hours to give a specimen. Then, a voltage. (square wave of 0.1 Hz and 1.5 V) was applied to the specimen through the electrodes on the front and back sides to measure the degree of displacement. Further, a voltage (square wave of 0.1 Hz) at which bubbles were produced was measured.

The results are set forth in Table 1.

Example 20

A rectangular ion-exchange resin product provided with gold electrodes (ion-exchange capacity: 1.8 meq/g) was cut into a size of 1.0 mm×20 mm and immersed in an aqueous solution (concentration: 0.5 M) of a chloride of $H_3N^+CH(CH_2OH)_2$ for 24 hours to give a specimen. Then, a voltage (square wave of 0.1 Hz and 1.5 V) was applied to the specimen through the electrodes on the front and back sides to measure the degree of displacement. Further, a voltage (square wave of 0.1 Hz) at which bubbles were produced was measured.

The results are set forth in Table 1.

Example 21

A rectangular ion-exchange resin product provided with gold electrodes (ion-exchange capacity: 1.8 meq/g) was cut into a size of 1.0 mm×20 mm and immersed in an aqueous solution (concentration: 0.5 M) of a chloride of $C_2H_5OCH_2CH_2N^+H_3$ for 24 hours to give a specimen. Then, a voltage (square wave of 0.1 Hz and 1.5 V) was applied to the specimen through the electrodes on the front and back sides to measure the degree of displacement. Further, a voltage (square wave of 0.1 Hz) at which bubbles were produced was measured.

The results are set forth in Table 1.

Comparative Example 2

A rectangular ion-exchange resin product provided with gold electrodes (ion-exchange capacity: 1.8 meq/g) was cut into a size of 1.0 mm×20 mm and immersed in a 0.1N NaOH aqueous solution for 24 hours to give a specimen. Then, a voltage (square wave of 0.1 Hz and 1.5 V) was applied to the specimen through the electrodes on the front and back sides to measure the degree of displacement. Further, a voltage (square wave of 0.1 Hz) at which bubbles were produced was measured.

The results are set forth in Table 1.

TABLE 1

|  | Degree of displacement (mm) | Bubble production voltage (V) |
| --- | --- | --- |
| Ex. 10 | 1.0 | 2.0 |
| Ex. 11 | 2.0 | 2.0 |
| Ex. 12 | 2.3 | 2.1 |
| Ex. 13 | 3.0 | 2.5 |
| Ex. 14 | 2.2 | 4.4 |
| Ex. 15 | 2.0 | 4.0 |
| Ex. 16 | 2.3 | 2.5 |
| Ex. 17 | 2.2 | 2.0 |
| Ex. 18 | 2.1 | 2.2 |
| Ex. 19 | 2.3 | 2.3 |
| Ex. 20 | 2.0 | 1.8 |
| Ex. 21 | 2.3 | 2.0 |
| Comp. Ex. 2 | 0.5 | 1.8 |

It can be seen from the above results that the polymeric actuators wherein the counter ions of the ion-exchange resin were exchanged with the alkylammonium ions represented by the formula (1) exhibit larger displacement and higher voltage for bubble production than those of the conventional polymeric actuator of Comp. Ex. 1 whose counter ion is $Na^+$.

What is claimed is:

1. A process for producing a polymeric actuator comprising an ion-exchange resin product and metal electrodes which are formed on the surface of the ion-exchange resin product and are insulated from each other, said actuator operating as an actuator by applying a potential difference between the metal electrodes when the ion-exchange resin product is in the water-containing state to allow the ion-exchange resin product to undergo bending or deformation, wherein the following steps (i) to (iii) are repeatedly conducted to form the metal electrodes ranging from the surface of the ion-exchange resin product to the inside thereof;

(i) a step of allowing the ion-exchange resin product to adsorb a metal complex in an aqueous solution (adsorption step), (ii) a step of reducing the metal complex adsorbed on the ion-exchange resin product by a reducing agent to deposit a metal on the surface of the ion-exchange resin product (deposition step), and (iii) a step of washing the ion-exchange resin product having the deposited metal (washing step), such that the deposition of the metal is conducted on the surface of the ion-exchange resin product and further in the resin product;

and the reduction of the medal complex forming the electrodes is carried out by immersing the ion-exchange resin product adsorbing the metal complex thereon in an aqueous solution containing a reducing agent.

2. A process as in claim 1, wherein the adsorption, deposition, and washing steps are repeatedly conducted for at least 4 cycles.

3. A process as in claim 2, wherein the adsorption, deposition, and washing steps are repeatedly conducted for a number of cycles in the range of from 4–9.

4. A process as in claim 1, wherein in the case of an ion-exchange resin product being a plate or a film, the ratio of the thickness (a1) of the metal electrode formed on the ion-exchange resin product to the thickness (b1) of the ion-exchange resin product including the metal electrode (a1/b1) is in the range of 0.03 to 0.40.

5. A process as in claim 1, wherein in the case of the ion-exchange resin product being a cylinder with the metal electrode formed on an outer or inner surface thereof, the ratio of the thickness (a2) of the metal electrode formed on the ion-exchange resin product to the thickness (b2) of the cylindrical ion-exchange resin product including the metal electrode (a2/b2) is in the range of 0.02 to 0.70.

6. A process as in claim 1, wherein in the case of the ion-exchange resin product being a cylinder with the metal electrode formed on both an inner and outer surface thereof, the ratio of the thickness (C) of the cylindrical ion-exchange resin product excluding the metal electrode to the thickness (b4) of the cylindrical ion-exchange resin product including the metal electrode (C/b4) is in the range of 0.20 to 0.95.

7. A process for producing a polymeric actuator according to claim 1, wherein a treatment is carried out prior to the formation of the metal electrode and said treatment is carried out by immersing an ion-exchange resin product in an alcohol such as methanol or ethanol.

8. A process for producing a polymeric actuator according to claim 1, wherein an ion-exchange resin product has an ion-exchange capacity of 0.8 to 3.0 meq/g.

9. A process for producing a polymeric actuator according to claim 1, wherein said metal complex is a gold complex.

10. A process for producing a polymeric actuator according to claim 1, wherein the adsorption, deposition, and washing steps are repeatedly conducted for a number of cycles up to 20.

11. A process for producing a polymeric actuator according to claim 1, wherein the number of cycles of steps is in the range of 4 to 9; surface resistance is not greater than $2\Omega$, when the length of an ion-exchange resin product of the obtained metal electrode is 20 mm and the width of an ion-exchange resin product of the obtained metal electrode is 1 mm.

12. A process for producing a polymeric actuator according to claim 1, wherein surface resistance is in the range of $2$–$0.5\Omega$ when the length of an ion-exchange resin product is 20 mm and the width of an ion-exchange resin product is 1 mm.

13. A process for producing a polymeric actuator according to claim 1, wherein a washing liquid in the washing step is selected from the group consisting of sodium hydroxide aqueous solution, the concentration of which is in the range of 0.01 to 5.0 mol/liter; sulfuric acid aqueous solution, the concentration of which is in the range of 0.01 to 6 mol/liter; or hydrochloric acid aqueous solution, the concentration of which is in the range of 0.01 to 6 mol/liter.

14. A process for producing a polymeric actuator comprising an ion-exchanging resin product and metal electrodes which are formed on the surface of the ion-exchange resin product and are insulated from each other, said actuator operating as an actuator by applying a potential difference between the metal electrodes when the ion-exchange resin product is in the water-containing state to allow the ion-exchange resin product to undergo bending or deformation, wherein the following steps (i) to (iii) are repeatedly conducted to form the metal electrodes ranging from the surface of the ion-exchanging resin product to the inside thereof;

(i) a step of allowing the ion-exchanging resin product to adsorb a metal complex in an aqueous solution (adsorption step), (ii) a step of reducing the metal complex adsorbed on the ion-exchange resin product by a reducing agent to deposit a metal on the surface of the ion-exchange resin product (deposition step), and (iii) a step of washing the ion-exchange resin product having the deposited metal (washing step), such that the deposition of the metal is conducted on the surface of the ion-exchange resin product and further in the resin product; and the ion-exchange resin product having metal electrodes is immersed in an aqueous solution containing alkylammonium ions to exchange the counter ions with the alkylammonium ions.

15. A process for producing a polymeric actuator according to claim 14, wherein said aqueous solution contains alkylammonium salt in the range of 0.01 to 10 mol/liter.

16. A process for producing a polymeric actuator according to claim 14, wherein the alkylammonium ions are alkylammonium ions containing at least ions represented by the following formula (1):

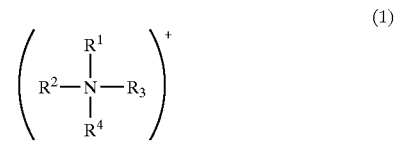

(1)

wherein R1 to R4 may be the same or different and are each a hydrogen atom, a hydrocarbon group, an oxygen-containing hydrocarbon group or a nitrogen-containing hydrocarbon group, at least one of R1 to R4 is a group other than a hydrogen atom, and two or more of R1 to R4 may be bonded to form a ring.

17. A process for producing a polymeric actuator according to claim 14, wherein the ion represented by the formula (1) is $CH_3N^+H_3$, $C_2H_5N^+H_3$, $(CH_3)_2N^+H_2$, $(C_2H_5)_2N^+H_2$, $(C_4H_9)_2N^+H_2$, $(C_5H_{11})_2N^+H_2$, $(CH_3)_3N^+H$, $(C_2H_5)_3N^+H$, $(C_4H_9)_3N^+H$, $(C_5H_{11})_3N^+H$, $(CH_3)_4N^+$, $(C_2H_5)_4N^+$, $(C_3H_7)_4N^+$, $(C_4H_9)_4N^+$, $H_3N^+(CH_2)_4N^+H_3$, $H_2C=CHCH_2N^+HCH_3$, $H_3N^+(CH_2)_4N^+H_2(CH_2)_4N^+H_3$, $HC\equiv CCH_2N^+H_2$, $CH_3CH(OH)CH_2N^+H_3$, $H_3N^+(CH_2)_5OH$, $H_3N^+CH(CH_2OH)_2$, $(HOCH_2)_2C(CH_2N^+H_3)_2$, $C_2H_5OCH_2CH_2N^+H_3$, 21
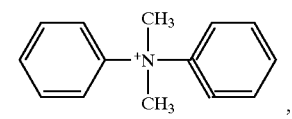
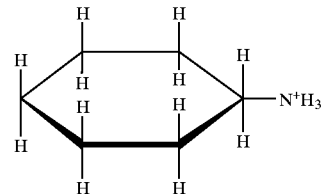
22
-continued
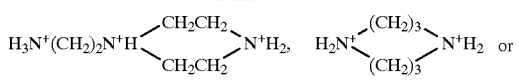
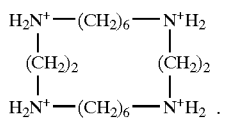
\* \* \* \* \*

UNITED STATES PATENT AND TRADEMARK OFFICE
CERTIFICATE OF CORRECTION

PATENT NO. : 6,762,210 B1
DATED : July 13, 2004
INVENTOR(S) : Oguro et al.

It is certified that error appears in the above-identified patent and that said Letters Patent is hereby corrected as shown below:

Column 22,
Line 3, "$H_2N^+(CH_2)_2N^+H$" should read -- $H_3N^+(CH_2)N^+H$ --

Signed and Sealed this

Eighteenth Day of January, 2005

JON W. DUDAS
*Director of the United States Patent and Trademark Office*